April 24, 1945.  K. B. GILLMORE ET AL  2,374,344

TOOTHED GEAR COUPLING

Filed Aug. 21, 1943

INVENTORS
KENNETH B. GILLMORE,
ROBERT H. WARDE,
BY Reynolds & Beach
THEIR ATTORNEYS Patented Apr. 24, 1945

2,374,344

UNITED STATES PATENT OFFICE 2,374,344

TOOTHED-GEAR COUPLING

Kenneth Bryan Gillmore, London, and Robert Henry Warde, Hatfield, England, assignors to The De Havilland Aircraft Company Limited, Hatfield, England Application August 21, 1943, Serial No. 499,590
In Great Britain September 30, 1942

10 Claims. (Cl. 74—440)

The present invention consists in a toothed-gear coupling, in which at least one of the co-operating toothed gears, whilst being non-rotatably mounted on its driving member for positive transmission of driving torque, includes means resiliently loading it towards the cooperating toothed member.

The invention has a particular application in airscrew pitch-changing mechanism which includes a toothed driving bevel through which the pitch-changing movement is transmitted to the individual airscrew blades under control of a driving bevel cooperating with driven bevels carried by or drivably coupled to the individual blade roots. In such arrangements the resilient loading may be incorporated as between the pitch-change driving bevel and the shaft, sleeve, or equivalent member which mounts it, the resilient loading operating to urge the bevel into engagement with the cooperating driven bevels transmitting pitch-change drive to the blades. In that case the resilient loading can conveniently operate in an axial sense, driving torque being transmitted through splines permitting axial displacement of the pitch-change driving bevel relative to the shaft or sleeve which mounts it, such splines at the same time serving to ensure rotation of the bevel in a fixed relation to its shaft or sleeve. In cases where the driven bevels on the individual blades are resiliently loaded in the sense according to the present invention, the effect of the resilience will necessarily be such that the driven bevels are urged radially towards the pitch-change driving bevel, although the loading may exert an influence which is a combination of axial and radial loading. In some cases both the driving and driven bevels may include resilient loading means.

In order that it may be clearly understood and readily carried into effect, the invention is hereinafter described with reference to the accompanying diagrammatic drawing, of which:

Figure 1:
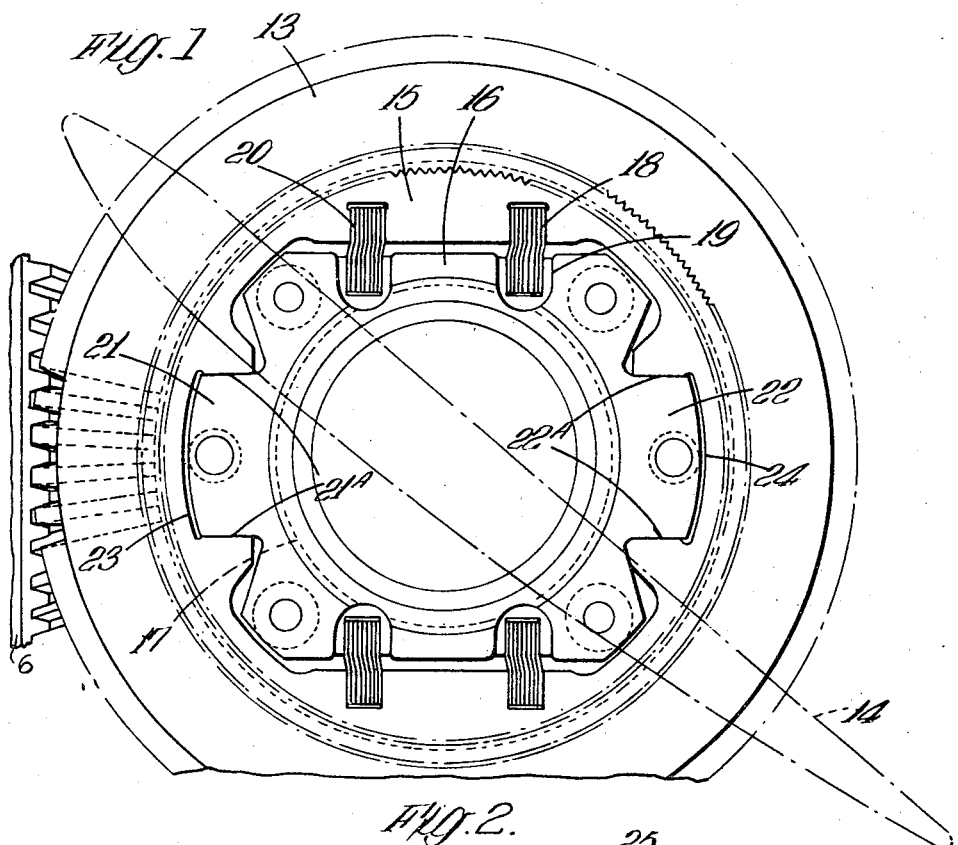
Figure 1 is a plan view illustrating the invention as applied in the resilient loading of a driven pitch-change bevel to urge it laterally into engagement with a driving bevel which is rigidly mounted.

Referring first to Figure 1, pitch-change drive is transmitted to the driving bevel gear 6, which is rotated for pitch-change operation in any convenient manner.

The driven bevel 13 meshing with the driving bevel 6 is mounted on the airscrew blade root, the airscrew blade being indicated by the reference numeral 14. Projecting internally from the bevel 13 is a bevel ring mounting plate 15, which is carried by a complementary mounting plate 16 formed on the boss 17 (in dotted lines) which mounts the blade shank. It will be noted that the mounting plates 15 and 16 are formed with complementary recesses or notches 18 and 19, respectively, into which notches spring packs 20 are inserted. The spring packs 20 are, in fact, laminated springs which are securely located in the complementary recesses 18 and 19, producing a tendency in the arrangement illustrated in Figure 1 to urge the mounting plate 15, and with it the bevel 13, leftwardly in relation to the mounting plate 16, which is securely borne by the airscrew hub, it being understood that in this case the pitch-change driving bevel which cooperates with the driven bevel 13 on the blade root is intended to be on the lefthand side. In this case the spring packs 20 can be presumed to be of the sort which are naturally straight but which are assembled in a somewhat distorted condition, so that the tendency is for them to straighten.

It will be noted that though the mounting plate 16 is of somewhat irregular formation, a certain amount of clearance is provided all round its periphery between it and the complementary mounting plate 15; but it will also be observed that diametrically-opposite driving projections 21 and 22 of the mounting plate 16 have their lateral edges 21A and 22A accurately fitting cooperating edges of the recesses 23 and 24 complementary to the driving projections 21 and 22, respectively, and formed in the mounting plate 15. Thus, whereas the arrangement is such that the spring packs 20 tend to urge the mounting plate 15 leftwardly with respect to the mounting plate 16, the driving torque is transmitted through the lateral edges of the cooperating projections and recesses 21, 23 and 22, 24, thus providing for resilient loading of the bevel 13 towards its cooperating pitch-change driving bevel (not shown), and at the same time a driving connection for effective rotation of the blades 14 each about its pitch-change axis, with complete freedom from backlash.

Whereas the arrangement shown in Figure 1 may be a convenient one in large airscrews where a fairly large diameter bevel can be accommodated, a situation may arise in smaller airscrews where the bevel diameter does not permit the mounting plates 15 and 16 to lie in the same plane. To meet such a case the arrangement shown in Figure 2 has been devised. In this case the spring packs 25 extend longitudinally of the blade mountings, the bevel mounting plate 26 being provided with upwardly-projecting dogs 27 which engage recesses 28 provided in the mounting plate 29 secured to the blade roots. The dogs 27 engage the edges 28A of the recesses 28 so that they are capable of transmitting driving torque with complete freedom from backlash; but on the contrary a clearance 30 is provided between the end of the recess and adjacent wall of the dog 27 so as to permit lateral movement under the influence of the spring packs 25, which, as with the arrangement shown in Figure 1, are secured in complementary recesses so as to extend under stress in shear between the bevel mounting ring 26 and the mounting plate 29 secured on the blade root.

Figure 2:
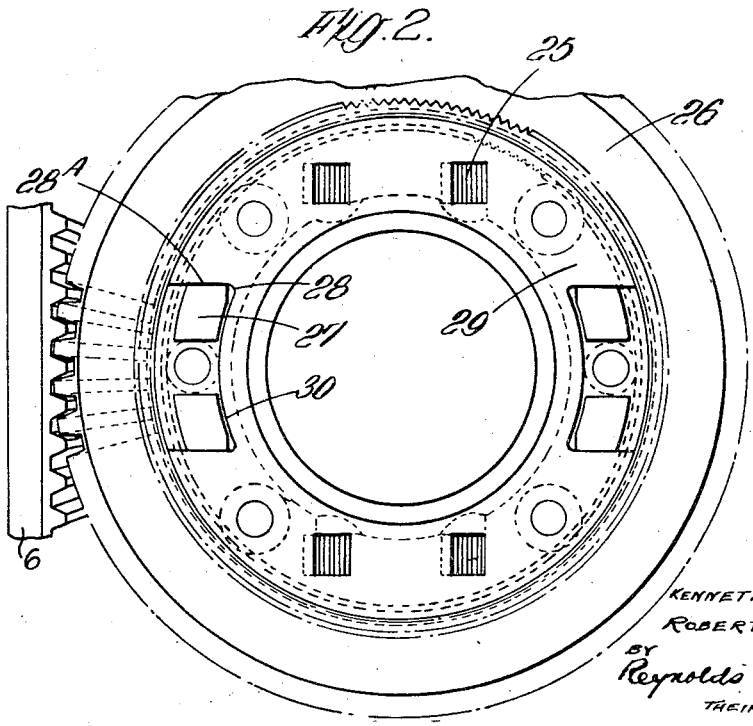
Figure 2 is a view similar to Figure 1 but illustrates a slightly modified arrangement.

It will be appreciated that in variable pitch airscrews rotation of the driven bevels mounted on the blade roots is only partial, and thus there is no objection to the fact that the driven bevels illustrated in Figures 2 and 3 are resiliently loaded leftwardly in a sense parallel to a diameter passing through the torque transmitting connection (projections 21, 22 and cooperating recesses 23, 24 in Figure 1, and dogs 27 and cooperating recesses 28 in Figure 2).

It is to be understood that the spring packs 20, 25 of Figures 1 and 2, respectively, instead of being in the form of laminated leaf springs, may comprise coil springs, rubber, or any other suitable resilient means.

Although the foregoing description deals more particularly with the application of the invention to variable pitch airscrews, it may equally well be applied to marine propellers in which provision is made for pitch changing; and in fact to any arrangement of toothed-gear coupling in which a driven member is but partially rotatable with respect to its driving member.

What we claim is:

1. In pitch-change drive-transmitting gearing of a variable pitch airscrew, a driven bevel having a backlash free driving connection with an airscrew blade root for pitch-change drive-transmitting purposes through members permitting limited relative movement in a sense parallel to a diameter intersecting the arc of engagement between said driven bevel and a cooperating pitch-change driving bevel, and resilient means operating between said members resiliently loading said driven bevel towards said driving bevel.

2. An arrangement as set forth in claim 1, in which the members which permit the relative movement under the influence of the resilient loading means are disposed one within the other.

3. An arrangement as set forth in claim 1, in which the members which permit the relative movement under the influence of the resilient loading means are disposed in axially spaced relationship.

4. Gear mechanism for retaining two meshing gears in engagement, comprising a rotative member disposed generally concentrically with one of such gears and spaced transversely of such member's axis of rotation from the other of such gears, and resilient means engaging both said rotatable member and the first gear, and operable to urge the first gear toward the second gear in a direction transversely of said rotative member.

5. The gear mechanism of claim 4, and guide means interengaged between the rotative member and the first gear guiding the same for relative movement parallel to only one plane in which the axis of rotation of the rotative member lies.

6. A mounting for a driven gear adapted to mesh with a drive gear, comprising a shaft mounted for rotation about an axis through less than a half-revolution and disposed substantially concentrically with the driven gear, the driven gear and said shaft having cooperating abutments guiding such gear and shaft for relative movement transversely of said shaft, and spring means interengaged between the driven gear and said shaft urging movement of the driven gear relative to said shaft toward the driving gear, while guided by said abutments.

7. A mounting for a driven gear adapted to mesh with a drive gear, comprising a shaft mounted for rotation about an axis through less than a half-revolution and disposed substantially concentrically with the driven gear, the driven gear and said shaft having cooperating abutments guiding such gear and shaft for relative movement transversely of said shaft, and a plurality of spring leaves interengaged between the driven gear and said shaft urging movement of the driven gear relative to said shaft toward the driving gear, while guided by said abutments.

8. The mounting of claim 7, in which the spring leaves are disposed transversely of the shaft.

9. The mounting of claim 7, in which the spring leaves extend generally parallel to the shaft.

10. The gearing mechanism of claim 7, in which the spring leaves are arranged in a plurality of packs, each composed of a plurality of spring leaves disposed in face to face engagement, and each pack has one end engaged with the shaft and its other end engaged with the driven gear.

KENNETH BRYAN GILLMORE.
ROBERT HENRY WARDE.